US005967715A

United States Patent [19]

Porper

[11] Patent Number: 5,967,715

[45] Date of Patent: Oct. 19, 1999

[54] ENGRAVING MACHINE

[76] Inventor: Joseph Porper, 7741 Alabama Ave. #11, Canoga Park, Calif. 91303

[21] Appl. No.: 09/099,246

[22] Filed: Jun. 17, 1998

[51] Int. Cl.[6] .......... B23C 1/16

[52] U.S. Cl. .......... 409/109; 409/123

[58] Field of Search .......... 409/92, 130, 124, 409/109, 110, 111, 112, 115, 123, 126; 384/901, 12

[56] References Cited

U.S. PATENT DOCUMENTS 3,777,616 12/1973 Mueller .......... 409/109
3,831,575 8/1974 Menghini .......... 409/124
4,095,633 6/1978 Kimball et al. .......... 409/109
4,184,720 1/1980 Zacherl .......... 308/9
4,227,557 10/1980 Allen .......... 409/124
4,248,282 2/1981 Waldron et al. .......... 409/124
4,288,185 9/1981 Lenz .......... 409/124
4,749,283 6/1988 Yokomatsu et al. .......... 384/12
4,787,430 11/1988 Miyamoto .......... 409/124
5,172,981 12/1992 Williams et al. .......... 384/12
5,256,011 10/1993 Taylor .......... 409/124
5,562,136 10/1996 Blackshear .......... 409/130

*Primary Examiner*—Andrea L. Pitts
*Assistant Examiner*—Adesh Bhargava
*Attorney, Agent, or Firm*—Gilbert Kivenson

[57] ABSTRACT

A machine for engraving using a stylus-guided cutting head is disclosed in the present invention. The cutter's motion along three, mutually perpendicular axes is transmitted by air-supported bearings so that play and frictional losses are greatly reduced. This promotes ease of use and accuracy which is of importance when engraving small areas such as billiard cue stick handles and the like.

2 Claims, 2 Drawing Sheets

ENGRAVING MACHINE

INTRODUCTION

The present invention relates to a machine for producing precise inlays in flat and curved surfaces and for doing accurate milling, drilling and material removal. The invention employs a guided X-Y-Z drive system to move a milling cutter in response to manual inputs and template guides.

The prior art contains engraving machines of the pantogragh type which employ a guide stylus at one junction of the arms and a milling machine at another junction. Bearing suspended arms cause "dead zones" and inaccurate following of the stylus by the cutting tool. This causes loss of accuracy and a poor copy of the template design.

With the present system, the play in the system can be made less than plus or minus one thousandth of an inch in any direction so that precision engraving and inlaying is readily achievable without the operator needing great skill.

SHORT DESCRIPTION OF THE INVENTION

The present invention utilizes air bearings in three mutually-perpendicular axes to suspend its working parts. Sliding and turning friction is considerably reduced so that the response of the cutting tool portion of the machine to movements of the guiding stylus is enhanced with minimum play or friction.

DETAILED DESCRIPTION OF THE INVENTION

Figure 1:
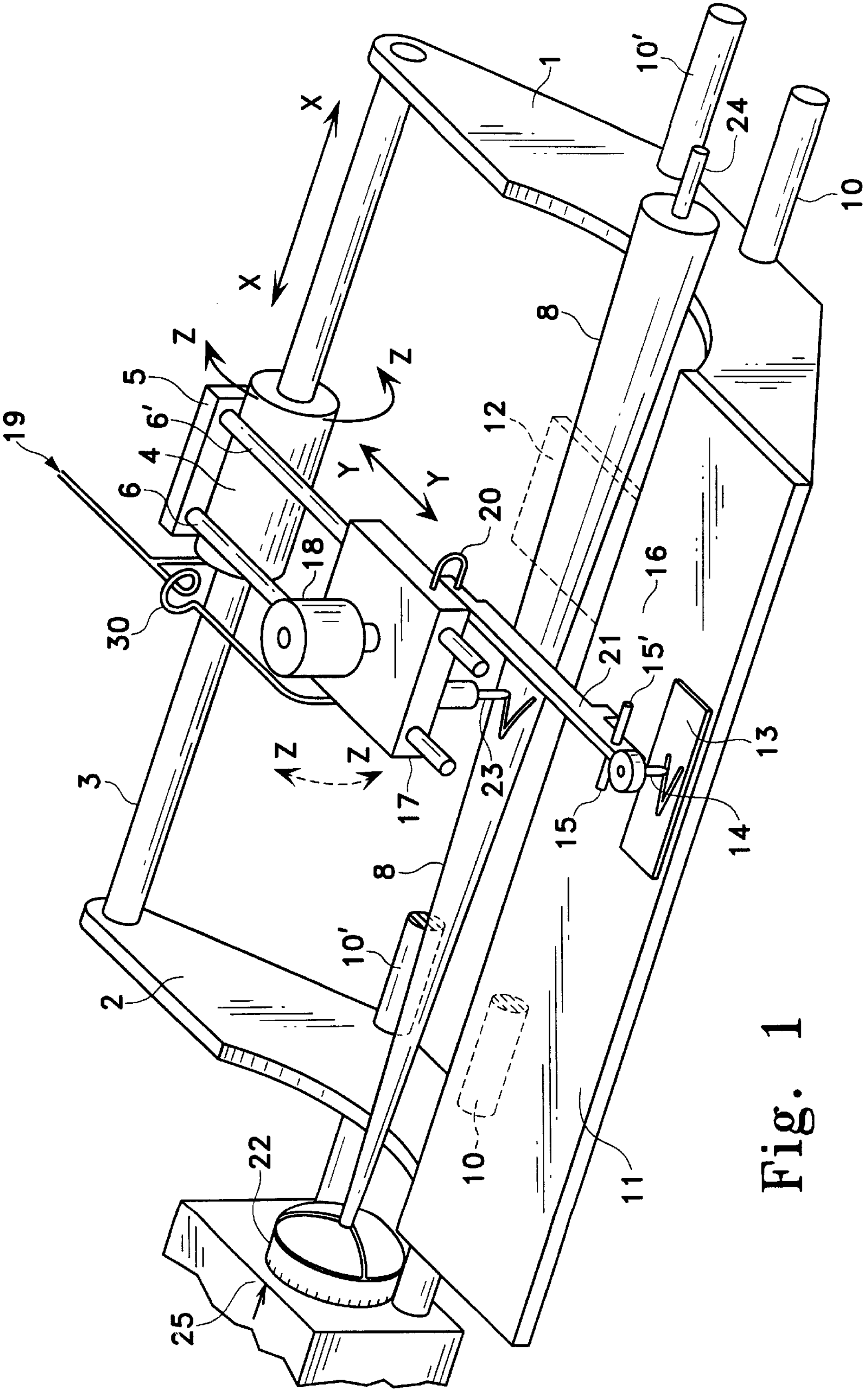
FIG. 1 is an isometric view of one embodiment of the engraving machine showing a low friction XYZ drive, a milling head, a stylus guide system and a lathe into which the machine is clamped.
Figure 2:
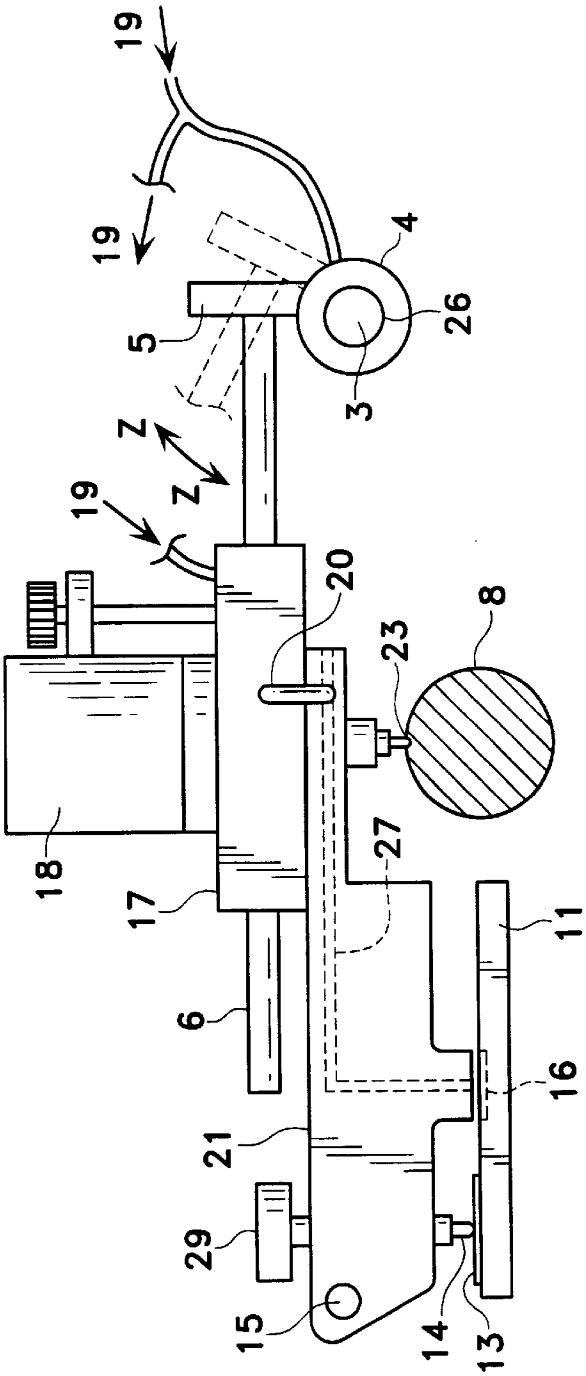
FIG. 2 is a partial,cross-sectional view taken across lines 2—2 of FIG. 1.

The present invention will be described with reference to FIGS. 1, 2 and 3. In FIG. 1, end forms 1 and 2 are mounted between shaft 3 and tracing table 11. Air bearing assembly 4 is slideably mounted around shaft 3, with tie bar 5 being rigidly joined to assembly 4 and to the two smaller shafts 6 and 6'. The latter are enclosed by the air box 17. An electric drive motor 18 is mounted on the air box with the motor shaft extending through the box and terminating in a cutting tool 23. A tracing arm 21 is joined to the underside of the air box (FIGS. 1 and 2). Lateral movement of arm 21 will cause the air bearing assembly 4 to move in direction X—X along with the other components attached to assembly 4: the shafts 6–6', the drive motor 18 and the cutter 23. Pulling or pushing on arm 21 will produce movement of the air box, the motor and the cutter in the direction Y—Y. Lifting of the arm will cause rotation of the air bearing assembly in the direction Z—Z . This motion is approximately vertical for distances slightly above the tracing table 11.

Bearing assembly 4 contains an annular space into which compressed air 19 at a pressure of 50 to 75 pounds per square inch is admitted. The air seeps through holes in the annulus and escapes through the slot 26 (FIG. 2) between shaft 3 and assembly 4. The air is also transmitted by flexible tube 26 to the air box 17 where it serves as a support for the box's movement along the shafts 6 and 6'. The air is then conducted by a section of tubing 20 between the air box and the tracing arm 21 which is drilled internally as shown in FIG. 2 . The air also escapes through a hole 16 where it helps support the weight of the tracing arm on the tracing table.

Figure 3:
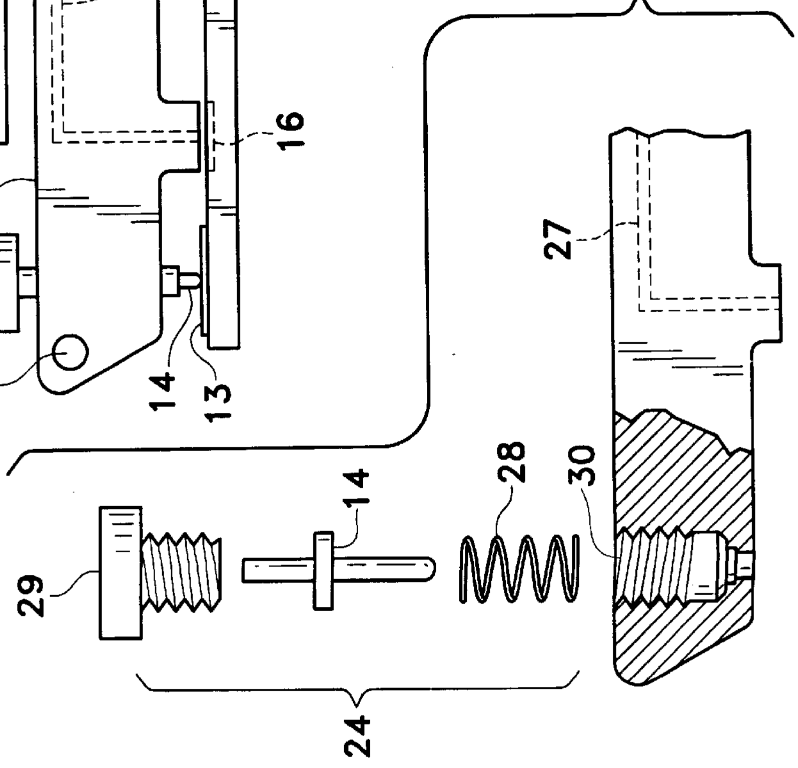
FIG. 3 is a partial cross section taken across the guide arm of FIG. 2 showing the construction of the adjustable stylus.

The arm terminates in the lifting and operating handles 15 and 15' and in the stylus assembly (24 in FIG. 3). The stylus 14 is made up of 2 cylindrical segments, one with a rounded end, the segments being separate by a shoulder. The lower segment is forced against spring 28 by tightening threaded knob 29 in the threads 30 in an opening in the guide arm. With the air pressure 19 applied, very little resistance to motion of the cutting tool is experienced when the operating handles 15 and 15' are moved in any direction. The illustration in FIG. 1 shows how a billiard stick 8 is being milled for inlays to be set in at a later time. The stick is in this case clamped between the headstock 22 and tailstock 24 of the lathe onto which the present invention is mounted. The billiard stick is locked and advanced through a preset angle by the lathe dividing apparatus 25. The template 13 contains the pattern to be milled and is used to guide the stylus. It would be feasible to make use of a lathe taper attachment for inlaying on tapered cylindrical surfaces as well. It would also be feasible to extend the tracing table 11 to include a flat working surface 12 for work such as flat ware.

The stylus can be loosened by loosening knob 29. This introduces play into the system so that a smaller cutter 23 can be employed and extended into sharper corners when the stylus is flexed into these parts of the template.

The invention can also be constructed in a free standing form and provided with clamping means without the use of a lathe foundation.

The utility of the invention can also be extended to making conventional engravings and to preparing inlay figures for insertion into pre milled spaces.

What is claimed is as follows:

1. A machine for accurately incising grooves and recesses in a working surface according to a design-bearing template utilizing air lubricated bearings to support motion of a motor driven milling tool in three,mutually perpendicular directions whereby dimensional fidelity of the design is transferred from said template to the working surface by virtue of the low friction conditions provided by the air lubrication.

2. A machine for accurately incising grooves and recesses in a working surface according a design-bearing template as described in claim 1 in which the motor driven milling tool can be directed along lateral, longitudinal and vertical axes by an attached tracing arm which contains an air lift discharge port and terminates in a tracing stylus which can be brought to bear against the template whereby part of the weight of motor driven milling tool is borne by the air lift resulting in minimum play and increased precision.

* * * * *